United States Patent
Windecker

(10) Patent No.: US 6,999,473 B2
(45) Date of Patent: Feb. 14, 2006

(54) METHOD FOR IMPROVING THE DATA TRANSMISSION QUALITY IN DATA PACKET ORIENTED COMMUNICATION NETWORKS

(75) Inventor: Rainer Windecker, München (DE)

(73) Assignee: Siemens Aktiengesellschaft, Munich (DE)

( * ) Notice: Subject to any disclaimer, the term of this patent is extended or adjusted under 35 U.S.C. 154(b) by 624 days.

(21) Appl. No.: 10/134,126

(22) Filed: Apr. 29, 2002

(65) Prior Publication Data
US 2002/0145972 A1 Oct. 10, 2002

Related U.S. Application Data

(63) Continuation of application No. PCT/DE00/03680, filed on Oct. 19, 2000.

(30) Foreign Application Priority Data
Oct. 28, 1999 (DE) ................. 199 52 048

(51) Int. Cl.
*H04J 3/16* (2006.01)

(52) U.S. Cl. ............... 370/468; 370/473; 370/477; 370/529; 714/746

(58) Field of Classification Search ........ 370/235, 370/252, 465, 468, 473, 474, 477, 511, 529; 714/748, 749, 751, 752, 746

See application file for complete search history.

(56) References Cited

U.S. PATENT DOCUMENTS

| | | | |
|---|---|---|---|
| 5,541,954 A | * | 7/1996 | Emi .......................... 375/133 |
| 6,145,109 A | * | 11/2000 | Schuster et al. ............ 714/752 |
| 6,512,761 B1 | * | 1/2003 | Schuster et al. ............ 370/352 |

FOREIGN PATENT DOCUMENTS

| | | |
|---|---|---|
| EP | 0 589 288 A2 | 3/1994 |
| EP | 0 800 294 A1 | 10/1997 |
| GB | 2 216 752 A | 10/1989 |

OTHER PUBLICATIONS

Jain, R.: Congestion Control and Traffic Management in ATM Networks: Recent Advances and a Survey, Computer Networks and ISDN Systems, vol. 28, No. 13, 1996, pp. 1723-1738.

* cited by examiner

Primary Examiner—Dang Ton
Assistant Examiner—Shick Hom
(74) Attorney, Agent, or Firm—Laurence A. Greenberg; Werner H. Stemer; Ralph E. Locher

(57) ABSTRACT

The transmission quality of a first data stream, in particular a real time data stream, which competes with at least one further data stream for a restricted transmission capacity at a network node in a data packet oriented communication network, is improved by increasing the data rate of the first data stream by adding redundant data at the transmitter end. During an overload situation, the increase in the data rate of the first data stream in comparison to that of the at least one further data stream overrides the latter to the extent that a greater proportion of the jointly available transmission capacity at the network node is now taken up by the first data stream.

10 Claims, 1 Drawing Sheet

METHOD FOR IMPROVING THE DATA TRANSMISSION QUALITY IN DATA PACKET ORIENTED COMMUNICATION NETWORKS

CROSS-REFERENCE TO RELATED APPLICATION

This application is a continuation of copending International Application No. PCT/DE00/03680, filed Oct. 19, 2000, which designated the United States.

BACKGROUND OF THE INVENTION

FIELD OF THE INVENTION

The invention lies in the communications field. More specifically, the invention relates to a method for improving the data transmission quality in data packet oriented communication networks, that is, for improving the transmission quality of a first data stream that is to be transmitted from a transmitter via a network node in a data packet oriented communication network to a receiver. The data stream has a predetermined data rate and it is to be passed on from the network node together with at least one further data stream. If the transmission capacity which is jointly available for the data streams is exceeded, data packets in the data streams to be transmitted are rejected by the network node.

In data packet oriented communication networks, also referred to as packet-switched communications networks, data streams to be transmitted are split into individual data packets, which are provided with a destination address and are transmitted via network nodes in the communication network to the respective transmission destination. In this case, the transmission process normally takes place within different layers of transmission protocols, such as the IP protocol (Internet protocol) as a layer three protocol and the so-called TCP protocol (transmission control protocol) or the so-called UDP protocol (user datagram protocol) as layer four protocols. The above numbering of the protocol layers relates to the so-called OSI reference model.

Data packets are frequently transmitted using a transmission protocol, such as the IP protocol, which does not guarantee correct transmission for each individual data packet. For the purposes of a transmission protocol such as this, overload situations which occur in a network node or on a transmission path are coped with by rejecting the data packets which initiate the overload situation, and thus by not transmitting them any further. The transmission destination normally uses a higher-level transmission protocol, such as the TCP protocol, to request the transmitter of the data packets to repeat the transmission of data packets which do not arrive at the transmission destination for this reason. However, such protection of data transmission is not suitable for real time applications since the necessity to request a data packet once again creates major delays at the receiver in reconstructing the data stream of transmitted data without gaps.

When transmitting real time data, such as voice data or video data, via a packet oriented communication network, the data rate of the real time data is frequently reduced (in order to reduce the overload in this way) in order to decrease the rate at which data packets are lost as a result of the overload. This is frequently done by using data compression methods. However, compression of real time data improves their transmission quality in an overload situation only when the overload situation is also predominantly caused by the transmission of real time data. If the overload situation is caused mainly by the transmission of other data, compression of the real time data essentially results only in the capability to transmit the other data more quickly. Furthermore, when real time data, especially voice data or video data, are compressed, the information content of the real time data is frequently not retained completely. As a result, the signal quality deteriorates, particularly in the case of voice data or video data. Furthermore, the compression process delays the real time data to a relatively major extent, in particular in the case of transmission via data packet oriented communication networks, since it takes a correspondingly longer time to fill individual data packets with compressed real time data.

SUMMARY OF THE INVENTION

It is accordingly an object of the invention to provide a method for improving the transmission quality of data to be transmitted via a data packet oriented communication network which overcomes the above-mentioned disadvantages of the heretofore-known devices and methods of this general type.

With the foregoing and other objects in view there is provided, in accordance with the invention, a data transmission method with improved transmission quality, the method which comprises:

transmitting a first data stream at a predetermined data rate from a transmitter via a network node in a data packet oriented communication network to a receiver;

forwarding data of the first data stream from the network node together with data from at least one further data stream and, if a transmission capacity that is jointly available for the data streams is exceeded, rejecting data packets in the data streams to be transmitted by the network node;

adding redundant data to the first data stream with the transmitter and thereby increasing a redundancy and increasing a data rate of the first data stream arriving at the network node in relation to a data rate of the at least one further data stream, and to thereby cause a greater proportion of the jointly available transmission capacity to be taken up by the data of the first data stream.

The method according to the invention allows the transmission quality of a data stream which is to be transmitted from a transmitter via a network node in a data packet oriented communication network to a transmitter to be improved considerably. This applies in particular to packet-switched transmission of real time data such as voice data and/or video data—also referred to as "Voice over IP" (VoIp) or "Video over IP" by the skilled artisans. The method according to the invention can be applied to a large number of communication networks, such as so-called local area networks (LAN) and wide area networks (WAN), using different transmission protocols, such as the Internet Protocol (IP), without any necessity to intervene in the existing structure of the communication networks. The transmitting network node may in this case be, for example, a bridge which is also referred to as an L2 switch, a router which is also referred to as an L3 switch, a so-called gateway or some other data packet switching device in the communication network.

Network nodes such as these normally reject data packets when the data rate of the data streams to be transmitted exceeds the transmission capacity of the network node, or of its transmission lines. In an overload situation such as this, a proportion of the data packets are generally rejected from all the data streams which are contributing to the overload.

For example, if the amount of data to be transmitted is twice the transmission capacity of a network node, every alternate data packet from all the data streams which are contributing to the overload is thus rejected by the network node.

On the basis of the method according to the invention for improving the transmission quality of a first data stream, which is competing with at least one further data stream (which is to be transmitted via the network node) for a restricted transmission capacity at the network node or in one of its transmission lines, the data rate of the first data stream is increased by the transmitter adding redundant data. During an overload situation, the increase in the data rate of the first data stream in comparison to the data rate of the at least one further data stream overrides the latter to the extent that a greater proportion of the jointly available transmission capacity is taken up by the first data stream. Once the data rate of the first data stream has been increased, assuming that the proportion of rejected data packets remains the same, or increases slightly, this results in a greater proportion of data packets that are not rejected in the first data stream arriving at the receiver than before the increase. The original information content of the first data stream can thus be reconstructed better by the receiver, thus improving the transmission quality.

The method according to the invention can be applied particularly advantageously to transmission of real time or quasi real time data at a predetermined data rate, since there is no need for any additional delay to the data to be transmitted. The method can be used particularly advantageously in local area networks, wherein no charges are incurred by increasing the data rate of a data stream to be transmitted.

The method according to the invention makes it possible to allocate a greater proportion of the transmission capacity of a network node to a data stream which is to be transmitted via that network node. In this context, it is particularly advantageous that there is no need for any intervention in existing communication networks or network nodes.

The redundancy of the first data stream can be increased in many ways, for example by adding parity information, checksums, and/or redundant data using the so-called CRC method (cyclic redundancy check). According to one particularly simple embodiment variant, the data rate can be increased by copying the data packets in the transmitter. One advantage of this embodiment variant is that there is normally also no need to make any changes to the receiver to carry out the method according to the invention, since the data packet transmission protocols which are normally used generally provide correct handling of data packets which arrive more than once. Apart from increasing the data packet rate, the data rate of the first data stream can also be increased by lengthening its data packets. This is particularly advantageous when the transmission capacity is restricted less by the data rate than by the data packet rate in the network node.

In accordance with an added feature of the invention, the receiver can determine a measure for the transmission quality of the first data stream. A measure such as this is represented, for example, by the proportion of data packets that are not received from the first data stream. This proportion can be determined, for example, by using the so-called RTP protocol (real time transport protocol) to number the data packets in the original first data stream. An acknowledgement can then be transmitted from the receiver to the transmitter, preferably using the so-called RTCP protocol (real time control protocol) depending on the determined measure for the transmission quality. The acknowledgement can be produced, for example, whenever the transmission quality falls below a predetermined limit.

Such monitoring and acknowledgement of the transmission quality is already provided as standard in the RTCP protocol, so that a large number of existing communication devices with the RTCP protocol implemented in them can be used unchanged as receivers for the purposes of the method according to the invention. The transmitter can use an acknowledgement received by it to add redundant data to the first data stream, depending on this acknowledgement. For example, on receiving an acknowledgement which indicates that only every alternate data packet in the first data stream is arriving at the receiver, the data rate of the first data stream can be doubled by the transmitter by adding an appropriate amount of redundant data. The acknowledgement may also contain information, predetermined by the receiver, on the nature and amount of redundant data to be added to the first data stream by the transmitter.

In accordance with a concomitant feature of the invention, the transmitter can transmit to the receiver information about the redundant data which it has added to the first data stream. This information may, for example, indicate the nature and amount of redundant data added. The information content of the first data stream can then be reconstructed from the data packets received by the receiver using the transmitted information. By way of example, a reconstruction method matched to the nature of the redundant data (for example the CRC method) may be chosen using the received information about the redundant data.

Other features which are considered as characteristic for the invention are set forth in the appended claims.

Although the invention is illustrated and described herein as embodied in a method for improving the data transmission quality in data packet oriented communication networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
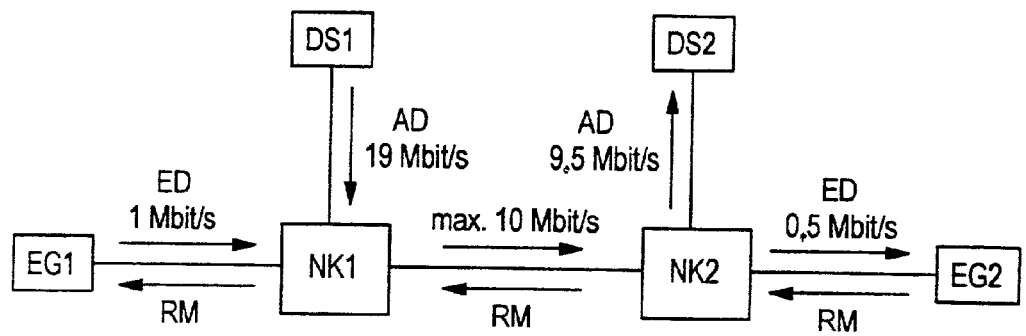
FIG. 1 is a schematic block diagram of a communications system for transmitting real time data and general data in a first transmission mode.

Referring now to the figures of the drawing in detail, each of the drawing figures shows, schematically, the same communication system with two terminals EG1 and EG2 for real time communication, for example two video telephones. The system also has two data servers DS1 and DS2, as well as two network nodes NK1 and NK2, which are coupled to one another directly or indirectly, in a data packet oriented communication network. The communication network may in this case, for example, be in the form of a local area network (LAN) whose LAN subnetworks are connected by way of the network nodes NK1 and NK2, which are in the form of routers. In the present exemplary embodiment, the maximum transmission capacity for data transmissions from the network node NK1 to the network node NK2 is restricted to 10 Mbit/s.

The terminal EG1 and the data server DS1 are coupled to the network node NK1, while the terminal EG2 and the data server DS2 are coupled to the network node NK2. A data connection is set up between the data server DS1 and the data server DS2, and a real time communication connection is set up between the terminal EG1 and the terminal EG2, via the network nodes NK1 and NK2. While general data AD are transmitted by the data server DS1 at a data rate of 19 Mbit/s for the purposes of the data connection, real time data ED, for example voice data and/or video data, must be transmitted at a data rate of 1 Mbit/s, which is governed by the real time requirements, for the purposes of the real time communication connection. Both the real time data ED and the general data AD are transmitted within data packets, which are each provided with a destination address.

FIG. 1 shows a first transmission mode, wherein the real time data ED are transmitted as a first data stream at a data rate of 1 Mbit/s to the network node NK1. In parallel with this, the general data AD are transmitted as a second data stream at a data rate of 19 Mbit/s from the data server DS1, likewise to the network node NK1. Since the maximum available transmission capacity for data transmissions from the network node NK1 to the network node NK2 is only 10 Mbit/s, but the sum of the data rates of the data streams to be transmitted is 20 Mbit/s, the network node NK1 passes on only every other one of the available data packets to the network node NK2. The other data packets are rejected. For the present exemplary embodiment, it is assumed that the network node NK1 handles the data streams to be transmitted with equal priority, that is to say it rejects approximately the same proportion of data packets from each data stream to be transmitted. This means only approximately half the data packets from the real time data ED and from the general data AD are in each case delivered via the network node NK2 to the respective transmission destination EG2 or DS2. A fragmented stream of general data AD thus arrives at the data server DS2 at a data rate of approximately 9.5 Mbit/s, and a fragmented stream of real time data at a data rate of approximately 0.5 Mbit/s arrives at the terminal EG2. While the data server DS2 can request the data server DS1 to retransmit the rejected data packets from the general data AD using a higher-level transmission protocol, such as the TCP protocol, any request for retransmission of rejected data packets from the real time data ED would generally lead to an intolerable delay. If voice data is being transmitted as the real time data ED, although the transmitted speech content generally remains comprehensible even when half the voice data to be transmitted is lost, owing to the natural redundancy in voice data, the transmission quality of the speech content is nevertheless considerably worse.

The terminal EG2 monitors the transmission quality of the received data stream of real time data ED by regularly determining the proportion of data packets which are not received. This proportion can preferably be determined, using the RTC protocol, by numbering the data packets in the first data stream transmitted by the terminal EG1. Then, depending on the determined transmission quality, the terminal EG2 sends an acknowledgement RM, preferably in accordance with the RTCP protocol, back via the network nodes NK2 and NK1 to the terminal EG1. In the present exemplary embodiment, the acknowledgement RM contains the information that only half of all the data packets of the real time data ED have been received by the terminal EG2. Such an acknowledgement, relating to the transmission quality of received real time data, is already normal in a large number of terminals which are used in conjunction with data packet oriented voice transmission (VoIP: voice over IP).

Figure 2:
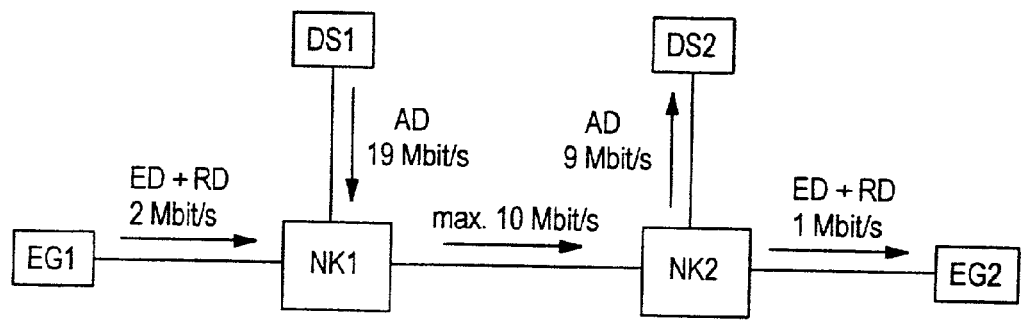
FIG. 2 is a schematic block diagram of the same communications system in a second transmission mode.

After receiving the acknowledgement RM and evaluating it, the terminal EG1 changes to a second transmission mode, which is shown in FIG. 2. In this case, the terminal EG1 adds additional redundant data RD to the data stream of real time data ED, in order to increase the redundancy in this data stream, so that its data rate is increased. The factor by which the data rate is increased is in this case governed by the proportion of data packets received by the terminal EG2, as indicated in the acknowledgement. Thus, in the present exemplary embodiment, the data rate of the first data stream is doubled to 2 Mbit/s by adding the redundant data RD.

Additional information in accordance with the CRC method may be added, for example, as redundant data RD. The respective data contents of individual data packets with real time data ED can preferably be distributed, together with the redundant data RD, over a number of data packets in the first data stream. According to one particularly simple variant, each individual data packet of real time data ED can also be duplicated by the terminal EG1, and can thus be transmitted to the network node NK1 twice.

The sum of the data rates of the data streams transmitted to the network node NK1 is now 21 Mbit/s, and thus exceeds the maximum transmission capacity of the transmission path between the network nodes NK1 and NK2 by 2.1 times. Since, averaged over time, only 10 of 21 data packets are thus passed on by the network node NK1, a data stream of fragmented general data AD arrives at the data server DS2 at a data rate of approximately 9 Mbit/s, and a fragmented data stream, comprising the real time data ED and the redundant data RD, arrives at the terminal EG2 at a data rate of approximately 1 Mbit/s. While the data rate of the received general data AD for the data server DS2 is reduced only slightly, the data rate of the data received by the terminal EG2 is approximately doubled. Since the data rate of the fragmented transmitted data stream comprising real time data and redundant data corresponds approximately to the data rate of the real time data ED originally to be transmitted, the terminal EG2 can reconstruct this real time data ED to a very great extent using the transmitted redundant data RD. The transmission quality of the real time data ED is thus improved considerably.

The method according to the invention thus makes it possible, in a simple way and without any changes being required to existing communication networks or their network nodes, to use the transmission quality to regulate a so-called quality of service parameter (QoS) for a data packet oriented connection. Since it is generally assumed that the transmission volume of non-real-time data will rise to a major extent in the future in comparison with the transmission volume of real-time data, one may quite confidently presume that increasing the data rate for real time transmissions using the method according to the invention will be tolerable, or will have a rather negligible effect.

If the terminal EG2 finds that the transmission quality of the received data stream has improved, that is to say a smaller proportion of data packets are being rejected, then the terminal EG2 can transmit a further acknowledgement to the terminal EG1, in order to cause the data rate to be reduced by reducing the proportion of redundant data added.

Furthermore, the terminal EG2 can check whether the transmission quality of the real-time data ED is being improved effectively as a result of an increase to the data rate of the data stream transmitted by the terminal EG1. If no predetermined improvement occurs, a further acknowledgement can be transmitted to the terminal EG1 in order in this way to cause the terminal EG1 to cancel the increase in the data rate once again. This reduces the load on the communication network.

I claim:

1. A data transmission method with improved transmission quality, the method which comprises:

transmitting a first data stream at a predetermined data rate from a transmitter via a network node in a data packet oriented communication network to a receiver;

forwarding data of the first data stream from the network node together with data from at least one further data stream and, if a transmission capacity that is jointly available for the data streams is exceeded, rejecting data packets in the data streams to be transmitted by the network node;

adding redundant data to the first data stream with the transmitter and thereby increasing a redundancy and increasing a data rate of the first data stream arriving at the network node in relation to a data rate of the at least one further data stream, and to thereby cause a greater proportion of the jointly available transmission capacity to be taken up by the data of the first data stream;

determining, in the receiver, from the first data stream a measure for a transmission quality thereof;

transmitting with the receiver an acknowledgement to the transmitter depending on the determined measure for the transmission quality; and adding redundant data to the first data stream with the transmitter depending on the acknowledgement.

2. The method according to claim 1, which comprises increasing a data packet rate for the first data stream by the transmitter for additional transmission of the redundant data.

3. The method according to claim 2, wherein the adding step comprises producing copies of data packets in the first data stream to form redundant data, for transmission to the network node.

4. The method according to claim 1, which comprises increasing a length of data packets in the first data stream by the transmitter for additional transmission of the redundant data.

5. The method according to claim 1, which comprises distributing, with the transmitter, data contents of a data packet to be transmitted in the first data stream, together with redundant data, over a number of data packets that are transmitted from the transmitter to the network node.

6. The method according to claim 1, which comprises reducing a data rate of the added redundant data by the transmitter if no predetermined improvement in the transmission quality is found.

7. The method according to claim 1, which comprises adding redundant data to the first data stream by the transmitter on request by the receiver.

8. The method according to claim 1, which comprises transmitting information about the redundant data from the transmitter to the receiver; and at least partially reconstructing, in the receiver, an information content of the first data stream from the data packets received by the receiver in the first data stream, depending on the transmitted information.

9. The method according to claim 1, which comprises transmitting quasi real time data within the first data stream.

10. In a data transmission method of the type in which a first data stream of a given data rate is transmitted in a data packet oriented communication network from a transmitter, via a network node, to a receiver, and the first data stream is to be passed on from the network node together with at least one further data stream, and wherein, if a transmission capacity that is jointly available for the data streams is exceeded, the network node rejects data packets in the data streams to be transmitted, the improvement which comprises:

adding redundant data to the first data stream to thereby increase a redundancy and to increase a data rate of the first data stream arriving at the network node relative to a data rate of the at least one further data stream, and to thereby take up a greater proportion of the jointly available transmission capacity with data of the first data stream relative to data of the at least one further data stream and to thereby improve a transmission quality of the first data stream;

determining, in the receiver, from the first data stream a measure for a transmission quality thereof;

transmitting with the receiver an acknowledgement to the transmitter depending on the determined measure for the transmission quality; and adding redundant data to the first data stream with the transmitter depending on the acknowledgement.

* * * * *